United States Patent [19]

Kokaji et al.

[11] 4,365,276
[45] Dec. 21, 1982

[54] COPY MAGNIFICATION CHANGE APPARATUS IN MAGNETIC COPYING MACHINE

[75] Inventors: Norio Kokaji; Kunio Kinoshita, both of Tokyo, Japan

[73] Assignee: Iwatsu Electric Co., Ltd., Tokyo, Japan

[21] Appl. No.: 133,861

[22] Filed: Mar. 25, 1980

[30] Foreign Application Priority Data

Mar. 26, 1979 [JP] Japan .................. 54-035359

[51] Int. Cl.³ .................. H04N 1/28; G03G 19/00
[52] U.S. Cl. .................. 358/301; 346/74.2; 358/287; 358/288
[58] Field of Search .................. 358/296–301, 358/213, 283, 287, 288; 346/74.1

[56] References Cited

U.S. PATENT DOCUMENTS 4,268,872 5/1981 Kokaji et al. .................. 358/301

FOREIGN PATENT DOCUMENTS 1193534 5/1965 Fed. Rep. of Germany.
38-19793 9/1963 Japan.

*Primary Examiner*—Raymond F. Cardillo, Jr.
*Attorney, Agent, or Firm*—Woodcock, Washburn, Kurtz, Mackiewicz & Norris

[57] ABSTRACT

In a magnetic copying machine, a reflected light from an original copy is converted into an electrical signal, and supplied to a magnetic recording head to form a magnetic latent image on a magnetic recording drum. The magnetic latent image is developed by a magnetic toner, and the toner picture is transferred onto a recording paper. The transferred toner picture is fixed on the recording paper, and the remaining toner on the surface of the magnetic recording drum is cleaned after the transfer operation. When the copy magnification factor is larger than one, the pulse interval of clock pulses generated in synchronization with the rotation of the magnetic recording drum for reading out the electrical signal is made longer than that used with actual-size copying, and the movement of the magnetic recording head in the axial direction of the magnetic recording drum per one revolution of the magnetic recording drum is made larger than that used with actual-size copying. When the copy magnification factor is smaller than one, the pulse interval of clock pulses generated in synchronization with the rotation of the magnetic recording drum for reading out the electrical signal is made shorter than that used with actual-size copying, and the movement of the magnetic recording head in the axial direction of the magnetic recording drum per one revolution of the magnetic recording drum is made shorter than that in the actual-size copy.

6 Claims, 14 Drawing Figures

COPY MAGNIFICATION CHANGE APPARATUS IN MAGNETIC COPYING MACHINE

BACKGROUND OF THE INVENTION

1. Field of the Invention

This invention relates to a copy magnification change apparatus in a magnetic copying machine, and more particularly to a copy magnification change apparatus in a magnetic copying machine which can be suitably applied to a magnetic duplicator by which numerous copies can be automatically and speedily obtained from one original copy.

2. Description of the Prior Art

The Japanese Patent Publication No. 19793/1963 discloses a magnetic copying machine in which an image of a document is recorded as a magnetic latent image on a recording drum by a magnetic head, the magnetic latent image is sequentially developed, transferred and fixed onto a recording paper to obtain a copy. In the magnetic copying machine, the image of the document can be recorded as the magnetic latent image in enlargement on the recording drum. The ratio of a diameter of a document winding drum to a diameter of the recording drum is predetermined for enlargement. Further, the ratio of a speed of read-out means to a speed of the magnetic head in horizontal direction is predetermined for enlargement by a gear speed change mechanism. Generally, when a magnetic copying machine has copy enlarging function and/or copy reducing function, it is desired that it has further actual-size copying (magnification factor: 1) function. For example, when a copy of A4-size is obtained from a document of B4-size by a magnetic copying machine, it is desired that a copy of A4-size can be obtained from a document of A4-size by the same magnetic copying machine and that the copy magnification factor can be easily changed over by simple operation, for example, by operation of a switch arranged on a panel. In the above-described prior art, for example, the ratio of the diameter of the one drum to that of the other drum should be changed for different magnification factors. That is not simple operation.

Further in an electro-static copying machine using Xerography method, a lens system should be moved for copy enlargement and copy reduction by a complicated mechanism. Since copy magnification is changed in mechanical manner, changing operation of copy magnification requires much time.

SUMMARY OF THE INVENTION

An object of this invention is to provide a copy magnification change apparatus in a magnetic copying machine which overcomes the above-described defects of the conventional copying machine, and in which copy magnification can be changed by simple operation.

Another object of this invention is to provide a copy magnification change apparatus in a magnetic copying machine which is simple in mechanical construction, and copy magnification can be changed only with electrical control and moreover can be instantaneously changed over.

A further object of this invention is to provide a copy magnification change apparatus in a magnetic copying machine in which copy magnifications can be differently changed in the primary scanning direction and the secondary scanning direction.

A still further object of this invention is to provide a copy magnification change apparatus in a magnetic copying machine in which at least two of different enlargements, reductions and actual-size copy operation can be selected for a desired copy edition for a single document.

In accordance with an aspect of this invention, a copy magnification change apparatus in a magnetic copying machine in which light from a document is converted into an electrical video signal by photoelectric converting means, the video signal is supplied to a magnetic head moving along the axial direction of a magnetic recording drum to form a magnetic latent image onto the magnetic recording drum; the copy magnification change apparatus comprising: (a) means for generating clock pulses to be supplied to the photoelectric converting means in synchronization of rotation of the magnetic recording drum to read out the electrical video signal from the photoelectric converting means, the pulse interval of the clock pulses for copy magnification factor larger than one being longer than that of the clock pulses for actual-size copy operation; (b) another means for increasing the movement length of the magnetic head along the axial direction of the magnetic recording drum for one line read-out of the photoelectric converting means for copy magnification factor larger than one in comparison with actual-size copy operation.

Various other objects, advantages and features of the present invention will become readily apparent from the ensuing detailed description, and the novel features will be particularly pointed out in the appended claims.

DESCRIPTION OF CERTAIN PREFERRED EMBODIMENTS

Figure 1A:
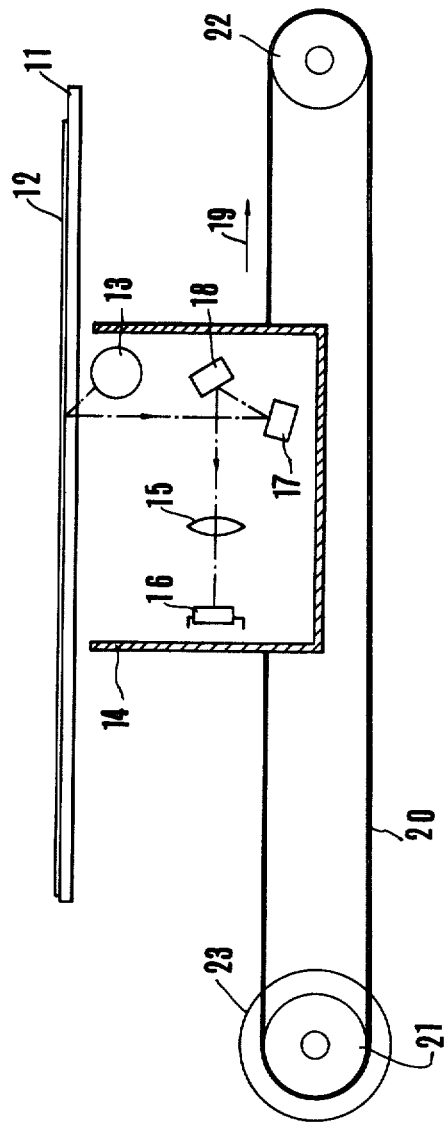
FIG. 1A is a schematic side view of a whole image pickup part in a magnetic duplicator according to one embodiment of this invention.
Figure 1B:
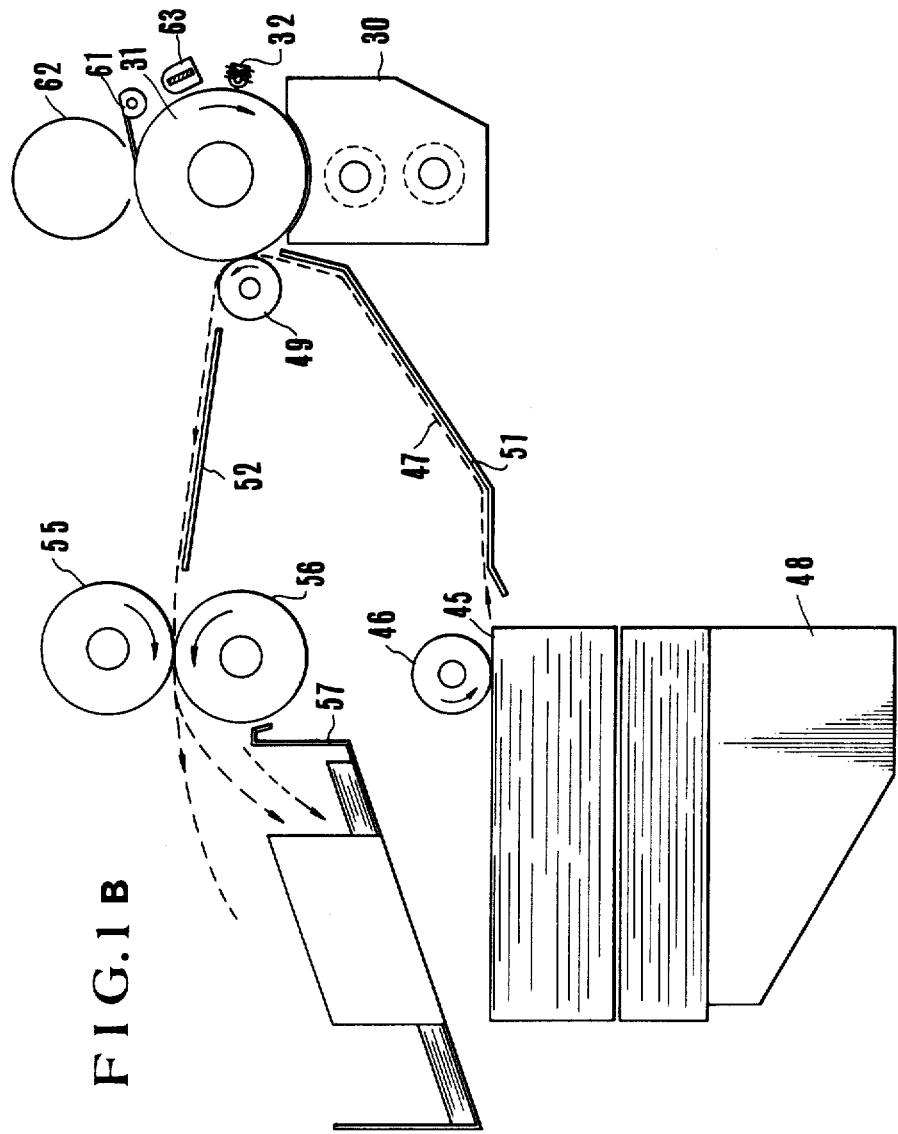
FIG. 1B is a schematic side view of a whole recording part in the magnetic duplicator of FIG. 1A.
Figure 2:
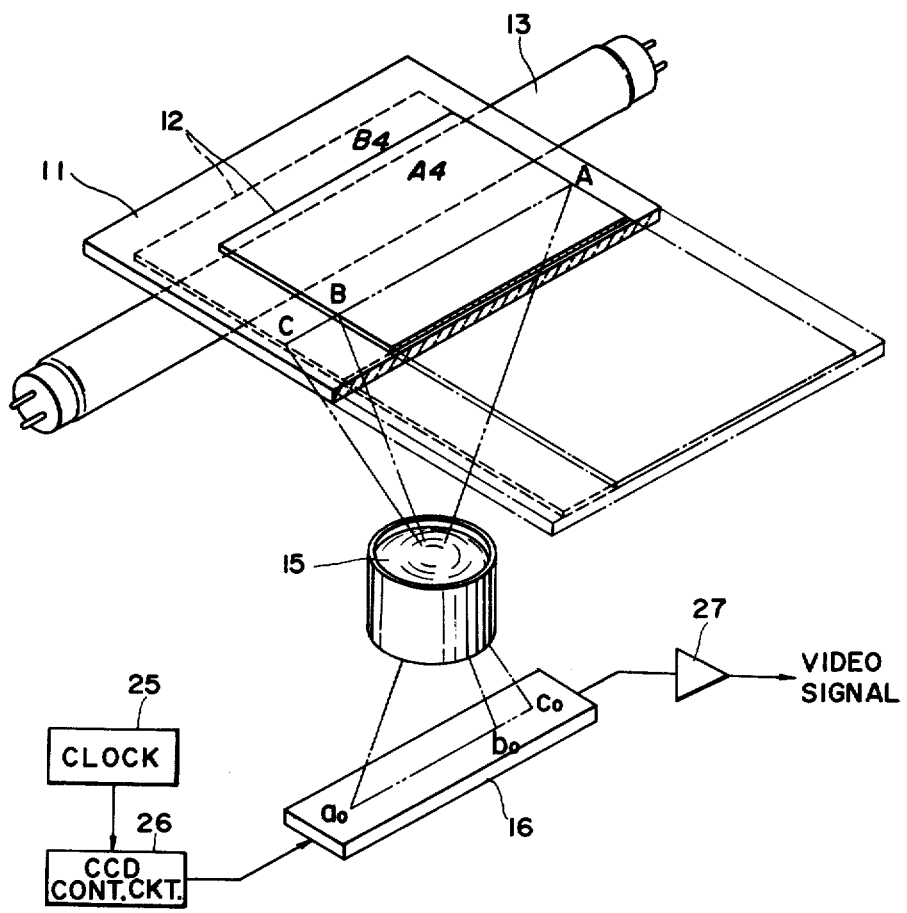
FIG. 2 is a schematic perspective view of the image pickup part of FIG. 1A.

FIG. 1A to FIG. 4 show the principle of a magnetic duplicator according to one embodiment of this invention. FIG. 1A and FIG. 2 show an image pick-up portion of the duplicator. In FIG. 1A and FIG. 2, an original copy, a drawing or a document 12 is supported face down on a document support 11 which comprises a transparent (e.g., glass) uniform plate. A part of the document 12 is irradiated by light sources 13 such as fluorescent lamp. Light from the light sources 13 is reflected by the surface of the document 12, further by mirrors 17 and 18 and converged onto a photoelectric conversion element or an image pick-up element 16 such as a CCD (Charge-Coupled Device) by a lens 15. Thus, a real image is formed on the CCD 16. A portion of the real image formed on an effective width of the CCD 16 is converted into an electrical video (picture) signal. The document support 11 supporting the document 12 is moved relatively (secondary scan) to the lamp 13 the lens 15 and the CCD 16 to obtain the picture signals on the whole surface of the document 12.

The light source 13, the lens 15, the CCD 16 and the mirrors 17 and 18 are mounted on a secondary scanning carriage 14 for the secondary scanning. The secondary scanning carriage 14 is so designed as to be movable in the rightward and leftward directions (FIG. 1A). Both ends of a wire 20 are fixed to the secondary scanning carriage 14. The wire 20 is wound on a pair of pulleys 21 and 22. Drive force of a pulse motor 23 as a drive source for the secondary scanning of the image pickup portion is transmitted through the pulley 21 and wire 20 to the secondary scanning carriage 14 to drive the latter in the rightward and leftward directions.

As shown in FIG. 2, clock pulses from a clock generator 25 are supplied through a CCD control circuit 26 to the CCD 16 to obtain the video signal from the latter. The output of the CCD is supplied through a video amplifier 27 to a recording portion of the duplicator.

Figure 3:
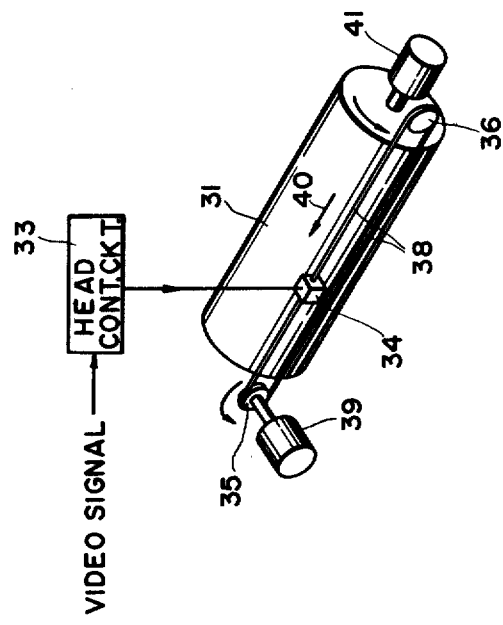
FIG. 3 is a schematic perspective view of a recording drum and a secondary scanning mechanism for explaining the secondary scanning operation of the recording part of FIG. 1B.

FIG. 1B and FIG. 3 show the recording portion of the duplicator. In FIG. 1B, a magnetic recording drum 31 constituting a magnetic recording medium is rotated in the clockwise direction as shown by the arrow. The picture signal obtained from the video amplifier 27 of the image pick-up portion shown in FIG. 1A is supplied through a magnetic head control circuit 33 to a magnetic head 32. A magnetic latent image is formed on the recording drum 31 by the magnetic head 32. The magnetic latent image is developed by a toner development device 30.

The magnetic head 32 is mounted on a secondary scanning support 34 for the secondary scanning of the recording portion. The secondary scanning support 34 is so designed as to be movable in the leftward and rightward directions (FIG. 3), namely in the axial direction of the recording drum 31. Both ends of a wire 38 are fixed on the secondary scanning support 34. The wire 38 is wound on a pair of pulleys 35 and 36. A drive force of a pulse motor 39 as a drive source for the secondary scanning of the recording portion is transmitted through a pulley 35 and the belt 38 to the secondary scanning support 34 to drive the latter in the axial direction of the recording drum 31.

A rotary encoder 41 is combined with a rotary shaft of the recording drum 31. Then rotary encoder 41 constitutes a part of the clock generator 25 shown in FIG. 2. One index pulse is generated per one revolution of the recording drum 31 from the rotary encorder 41. Numerous clock pulses are generated between the index pulses.

On the other hand, referring to FIG. 1B, a record paper 45 is led into a record paper transport path 47 shown by dotted line from a paper supply elevator 48 by a feed roller 46, and it is introduced into the gap between the recording drum 31 and a transfer roller 49 by means of guide rollers (not shown). Paper guide members 51 and 52 are arranged for forming the transport path 47. While the record paper 45 passes between the recording drum 31 and the transfer drum 49, the toner image is transferred onto the record paper 45. The record paper 45 is further transported along the transport path and the toner image is fixed on the record paper 45 between fixing rollers 55 and 56 of a fixing device. Then, it is discharged into a copy receiver 57. The remaining toner on the recording drum 31 after the above described transferring operation is removed by a cleaning blade 61 and an air accumulator 62 of a cleaning device. The latent image on the recording drum 31 is erased by an erasing head 63 which extends over the whole width of the recording drum 31, before a next latent image is formed on the recording drum 31.

Figure 4:
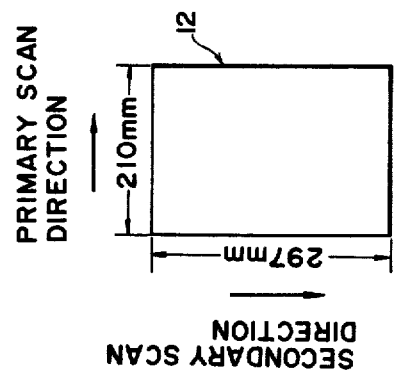
FIG. 4 is a plan view of a document in the image pickup part of FIG. 1A and FIG. 2 for explaining scanning directions of the document.

A primary scanning direction in the latent image formation is in the direction extending from a point A to another point B on the document 12 shown in FIG. 2 with respect to the image pickup portion, while it is in the peripheral direction of the recording drum 31 shown in FIG. 1B with respect to the recording portion. One line of the pirmary scanning is effected in one revolution of the recording drum 31. While one line of the primary scanning for the image pickup and latent image formation is effected, one line of the secondary scanning of the image pickup portion and recording portion is effected. The secondary scanning of the image pickup portion is effected by moving the secondary scanning carriage 14 shown in FIG. 1A in the direction shown by the arrow 19, while the secondary scanning of the recording portion is effected by moving the secondary scanning support 34 shown in FIG. 3 in the direction shown by the arrow 40. The primary scanning direction and the secondary scanning direction are shown in FIG. 4 with respect to a document 12 of A4-size.

The whole surface of the document 12 is scanned by repeating the above primary and secondary scannings. Thus, the magnetic latent image corresponding to the document 12 is formed on the recording drum 31.

Next, there will be described sequential operations of the duplicator shown in FIG. 1 to FIG. 4.

Duplication or copy starts with a copy (duplicating) switch. First, the magnetic latent image on the recording drum 31 is erased. Next, the image pick-up portion operates for photoelectric conversion to obtain the picture signal. The picture signal is converted into a magnetic signal, and recorded as the latent image on the recording drum 31. Next, it is checked whether the scanning of the document is completed or not. The latent image formation mode is completed with the confirmation of the completion of the scanning of the document. The copy mode follows.

In the copy mode, paper feeding, development, transfer and fixing are effected in order, and a copy of the document is obtained. After the transfer, cleaning of the recording drum 31 is effected in concurrence with the fixing. A series of the paper feeding, development, transfer, fixing, and cleaning is repeated, until the number of the obtained copies reaches a predetermined or desired number. When the copies of the desired number are obtained, the copying operation automatically ends. Next, there will be described methods of change of copy magnification, namely of copy enlargement and copy reduction of document.

First, enlargement and reduction in the primary scanning direction in the primary scanning direction will be described with reference to FIG. 1 to FIG. 6.

Figure 5:
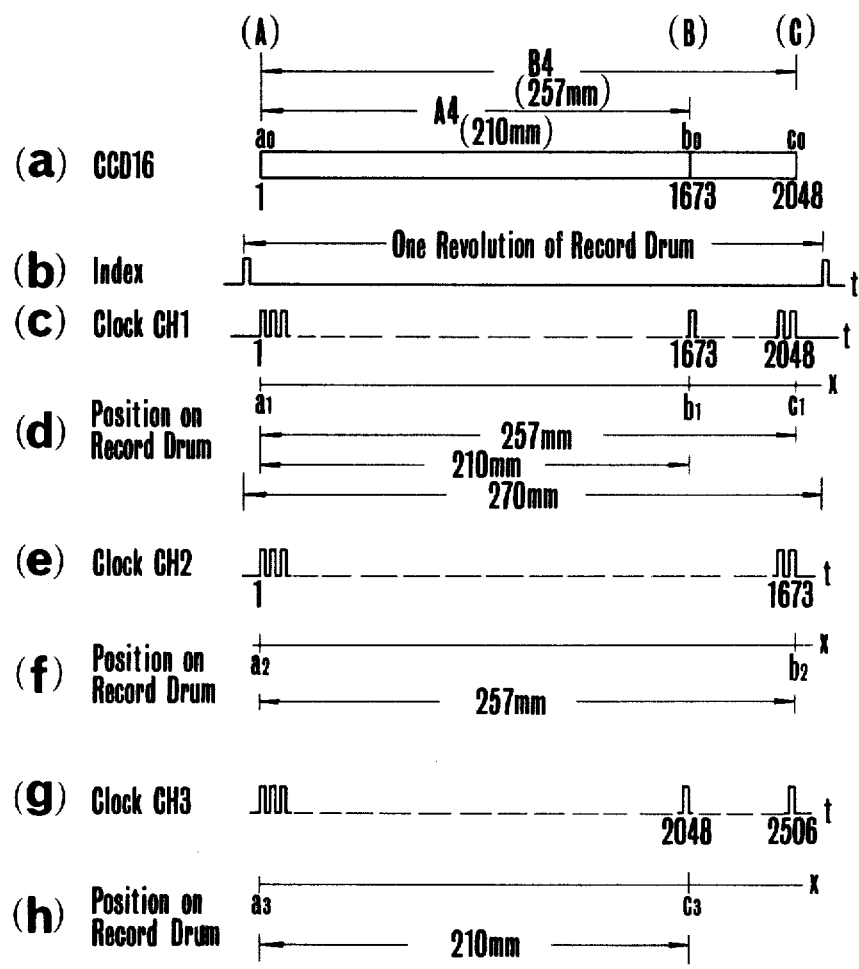
FIG. 5 (a) to (h) are views showing the relationships between positions on CCD and recording drum, index pulse timing and clock pulse timings for explaining the principle of enlargement and reduction in the primary scanning direction in the magnetic duplicator of FIG. 1A and FIG. 1B.
Figure 6:
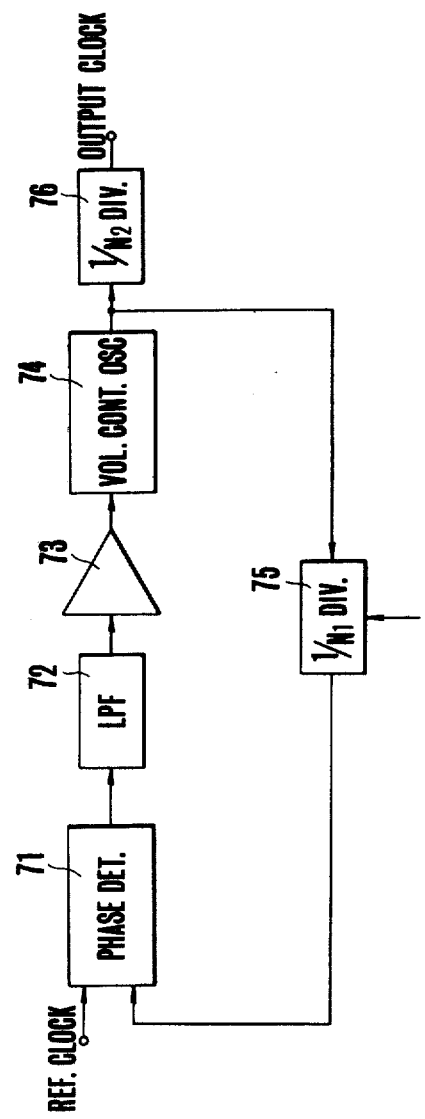
FIG. 6 is a block diagram of a PLL (Phase Locked Loop) circuit for generating the clock pulses shown in FIG. 5.
Figure 7:
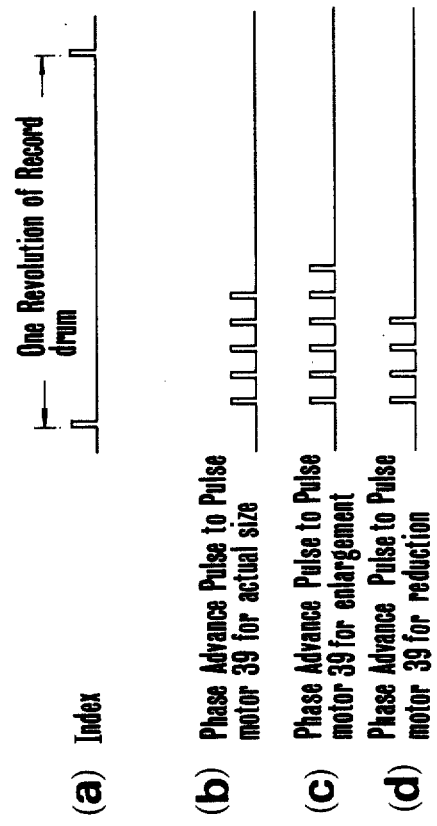
FIG. 7 (a) to (d) are views showing the relationships between index pulse and phase advance pulses for a recording part secondary scanning pulse motor for explaining the principle of enlargement and reduction in the secondary scanning direction in the magnetic duplicator of FIG. 1A and FIG. 1B.

FIG. 5($a$) represents a CCD 16. Positions A, B and C on the document support 11 in FIG. 2 are projected on positions $a_0$, $b_0$ and $c_0$ on the CCD 16, respectively. It is assumed that a document of A4-size (210 mm wide) is projected on an $a_0$–$b_0$ region of the CCD 16, and that a document of B4-size (257 mm wide) is projected on an $a_0$–$c_0$ region of the CCD 16. For example, when the CCD 16 is constituted by 2048 bits, the width of 257 mm corresponds to 2048 bits, and the width of 210 mm corresponds to 1673 bits. A clock channel CH1 of the rotary encoder 41 generates 2048 clock pulses (regular intervals) shown in FIG. 5($c$) per one revolution of the recording drum 31 (FIG. 5($b$)). The clock pulses of the channel CH1 are used as read-out pulses for the CCD 16. The image on the CCD 16 (FIG. 5($a$)) is recorded on the recording drum 31 in the manner shown in FIG. 5($d$). The $a_0$–$c_0$ region of the CCD 16 corresponds to an $a_1$–$c_1$ region of the recording drum 31. Peripheral positions x and times t at which the image is recorded on the recording drum 31 are determined by the rotary encoder 41 in accordance with the rotation of the recording drum 31. A time t(1) corresponds to a position $a_1$. A time (1673) corresponds to a position $b_1$. A time (2048) corresponds to a position $c_1$. Intermediate times t correspond proportionally to intermediate positions x, respectively. When the length of the $a_1$–$c_1$ region is 257 mm, the width A–C of the document (257 mm) projected on the $a_0$–$c_0$ region of the CCD 16 is recorded in actual size on the recording drum 31. The width A–B of the document (210 mm) is recorded in actual size on the $a_1$–$b_1$ region of the recording drum 31. 215/257 is equal to 1673/2048. The length of the CCD 16 corresponds to the width of the document support 11, and to the length of the periphery of the recording drum 31. However, the length of the periphery of the recording drum 31 is somewhat larger than the width of the B4-size, and it is 270 mm.

A clock channel CH2 of the rotary encoder 41 generates 1673 clock pulses (FIG. 5($e$)) per one revolution of the recording drum 31. When the clock pulses of the clock channel CH2 are used as read-out pulses for the CCD 16, video signals are obtained only from 1673 bits of the CCD 16 per one revolution of the recording drum 31. In other words, the image projected on the $a_0$–$b_0$ region of the CCD 16 is recorded on an $a_2$–$b_2$ region of the recording drum 31 (FIG. 5($f$)). The width (210 mm) of the A4-size is projected on the $a_0$–$b_0$ region of the CCD 16. Since the length of the $a_2$–$b_2$ region is equal to the length of the $a_1$–$c_1$ region (257 mm), the document 12 of the width of 210 mm is so recorded on the recording drum 31 as to be enlarged to the width of 257 mm. Thus, A4-size is enlarged to B4-size.

A clock channel CH3 of the rotary encoder 41 generates 2506 clock pulses (FIG. 5($g$)) per one revolution of the recording drum 31. When the clock pulses of the clock channel CH3 are used as read-out pulses for the CCD 16, the image projected on the $a_0$–$c_0$ region (2048 bits) of the CCD 16 is recorded on an $a_3$–$c_3$ region of the recording drum 31 (FIG. 5($h$)). Since 2048/2506 is equal to 210/257, the length of the $a_3$–$c_3$ region is equal to 210 mm. The $a_0$–$c_0$ region includes a video information of the document 12 of the width 257 mm. Accordingly, the width of 257 mm is reduced to the length of the $a_3$–$c_3$ region (210 mm). In other words, B4-size is reduced to A4-size.

In order to facilitate the description, the first channel CH1 generates 2048 clock pulses, the second channel CH2 generates 1673 clock pulses and the third channel CH3 generates 2506 clock pulses, per one revolution of the recording drum 31. However, it is more convenient in an actual duplicator that the numbers of clock pulses of the first, second and third channels CH1, CH2 and CH3 are somewhat different from the above described numbers. The reason will be hereinafter described with reference to FIG. 10 and FIG. 11.

In the above description, the rotary encoder 41 generates the index pulses and the three trains of clock pulses. However, the rotary encoder 41 may be so designed as to generate the index pulses and only one train of clock pulses. In that case the one train of clock pulses is used as a reference clock for a PLL (Phase Locked Loop) circuit shown in FIG. 6. A train of clock pulses for another channel is generated by the PLL circuit of FIG. 6.

The PLL circuit consists of a phase detector 71, a low pass filter 72, an amplifier 73, a voltage control oscillator 74, a $1/N_1$ divider 75 and a $1/N_2$ divider 76. For example, when the rotary encoder 41 generates 2200 clock pulses as reference clock per one revolution of the recording drum 31, and $N_1$ and $N_2$ are 9 and 11, respectively, a train of 1800 clock pulses per one revolution for the second channel is obtained from the PLL circuit.

Instead of the rotary encoder 41, clock pulses may be magnetically recorded on one part of the recording drum 31. The reproduced clock pulses are used as the read-out pulses for the CCD 16. Or when a drive source for the recording drum 31 is a synchronous motor, read-out pulses for the CCD 16 can be obtained from an oscillator for driving the synchronous motor.

Next, there will be described enlargement and reduction in the secondary scanning direction with reference to FIG. 1 to FIG. 4 and FIG. 7.

One step of the secondary scanning is taken per one revolution of the recording drum 31. The pulse motor 23 shown in FIG. 1A and the pulse motor 39 shown in FIG. 3 are used as drive source for the secondary scanning. The secondary scanning carriage 14 (FIG. 1A) and support 34 (FIG. 3) are moved by 0.02 mm with one phase advance pulse. Accordingly, when five phase advance pulses (FIG. 7($b$)) are supplied to the pulse motor 23 per one revolution of the recording drum 31, the secondary scanning carriage 14 for image pickup is moved by 0.02 mm × 5 = 0.1 mm. Similarly, when five phase advance pulses (FIG. 7(b)) are supplied to the pulse motor 39 per one revolution of the recording drum 31, the record portion is moved by 0.02 mm × 5 = 0.1 mm. Thus, copy of actual size is obtained.

On the other hand, when six phase advance pulses (FIG. 7(c)) are supplied to the pulse motor 39 per one revolution of the recording drum 31, the recording portion is moved by 0.02 mm × 6 = 0.12 mm. Thus, the recording portion is moved longer by 20% than the image pickup portion. As the result, A4-size is enlarged nearly to B4-size in the secondary scanning direction.

When four phase advance pulses (FIG. 7(d)) are supplied to the pulse motor 39 per one revolution of the recording drum 31, the recording portion is moved by 0.02 mm × 4 = 0.08 mm. Accordingly, the recording portion is moved shorter by 20% than the image pickup portion. As the result, B4-size is reduced nearly to A4-size in the secondary scanning direction.

Speed increase rates or speed reduction rates of transmission mechanisms for the pulse motors 23 and 39 can be arbitrarily varied, and further the number of phase advance pulses per one revolution of the recording drum 31 can be arbitrarily varied. Accordingly, the copy magnification in the secondary scanning direction can be arbitrarily varied.

The moving length in the secondary scanning direction per one revolution of the recording drum 31 is varied with the number of the phase advance pulses. However, transmission systems different in speed increase rate or speed reduction rate may be provided for varying the moving length. In that case, the systems are changed over by electro-magnetic clutches. A servo motor may be used instead of the pulse motor.

When the spacing between the secondary scanning lines is variable, an electro-static copying machine has the defect that a recorded image become unnatural in accordance with the diameter of a recording stylus. However, the defect of the electrostatic copying machine is removed by the magnetic duplicator of this invention in which the core thickness of the magnetic head 32 is so designed as to be larger than the maximum spacing between the secondary scanning lines, as described in the U.S. Pat. No. 4,072,957. In that case, the recording drum is scanned in overlap by the difference between the core thickness of the magnetic head 32 and the spacing between the secondary scanning lines.

Figure 8:
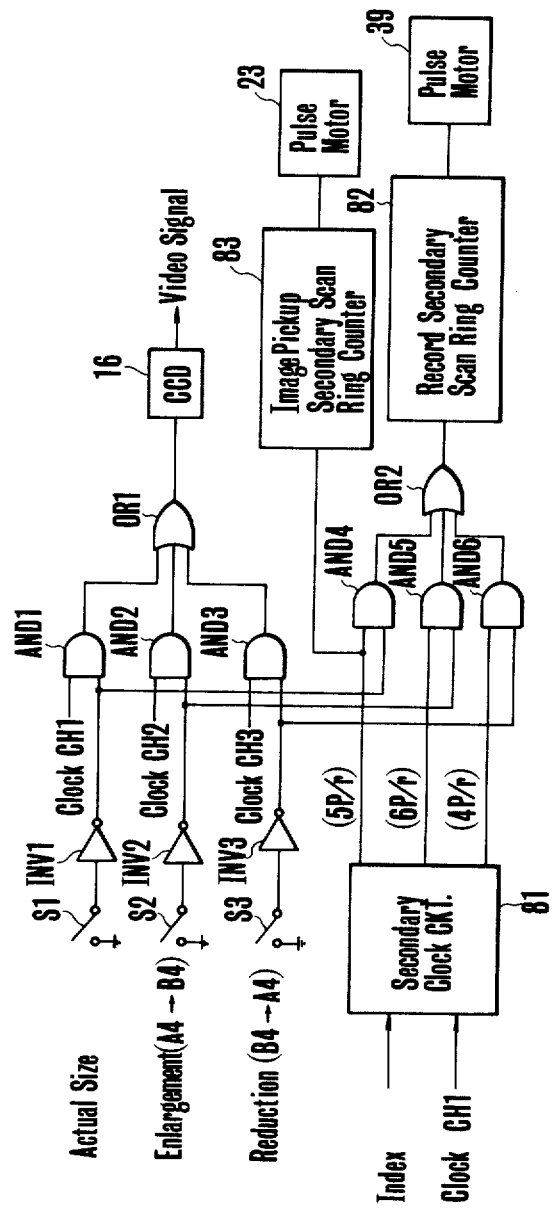
FIG. 8 is a block diagram of one example of a control circuit for changing copy magnification by change-over of switches arranged on an operating panel in the magnetic duplicator of FIG. 1A and FIG. 1B.

FIG. 8 shows one example of a control circuit in which the copy magnification is selected by changeover of switches arranged in an operating panel.

A switch $S_1$ for actual size is connected through an invertor $INV_1$ to an AND circuit $AND_1$. When the switch $S_1$ is closed, the clock pulses CH1 of the first channel are supplied as the read-out clock through the AND circuit $AND_1$ and OR gate $OR_1$ to the CCD 16.

A switch $S_2$ for A4→B4 enlargement is connected through an inverter $INV_2$ to an AND circuit $AND_2$. When the switch $S_2$ is closed, the clock pulses CH2 of the second channel are supplied as the read-out clock through the AND circuit $AND_2$ and the OR gate $OR_1$ to the CCD 16.

A switch $S_3$ for B4→A4 reduction is connected through an inverter $INV_3$ to an AND circuit $AND_3$. When the switch $S_3$ is closed, the clock pulses CH3 of the third channel are supplied as the read-out clock through the AND circuit $AND_3$ and the OR gate $OR_1$ to the CCD 16.

The three trains of five clock pulses, six clock pulses and four clock pulses per one revolution of the recording drum 31 are generated from a secondary scanning clock circuit 81 on the basis of the index pulse and the clock pulse of the first channel CH1. They are supplied to AND circuits $AND_4$, $AND_5$ and $AND_6$, respectively. One of the three trains of clock pulses is selectively supplied through the corresponding one of the AND circuits $AND_4$, $AND_5$ and $AND_6$ to an OR gate $OR_2$ with the selective closing of the switches $S_1$, $S_2$ and $S_3$. It is further supplied through the OR gate $OR_2$ and a ring counter 82 for the record secondary scanning to the pulse motor 39 for the recording portions. On the other hand, in the image pickup portion, the train of five clock pulses per one revolution of the recording drum 31 is supplied through another ring counter 83 for the image pickup secondary scanning to the pulse motor 23 for the image pickup portion. As understood from the above description of FIG. 5 and FIG. 7, actual size copy, enlargement and reduction are effected with the control circuit of FIG. 8.

Five phase advance pulses per one revolution of the recording drum 31 have been supplied to the pulse motor 23 for one step of the image pickup secondary scanning, while five, six or four phase advance pulses per one revolution of the recording drum 31 have been supplied to the pulse motor 39 for one step of the record secondary scanning for the actual size copy, enlargement or reduction. However, on the contrary, five phase advance pulses per one revolution of the recording drum 31 may be supplied to the pulse motor 39 for one step of the record secondary scanning, while five, six or four phase advance pulses per one revolution of the recording drum 31 may be supplied to the pulse motor 23 for one step of the image pickup secondary scanning for the actual size copy enlargement or reduction.

Next, there will be described another principle of the enlargement and reduction in the primary scanning direction with reference to FIG. 1 to FIG. 4 and FIG. 9 to FIG. 11.

Figure 9:
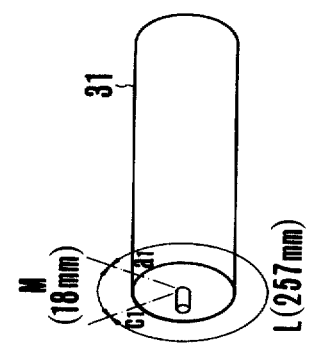
FIG. 9 is a schematic perspective view of a recording drum for explaining another principle of enlargement and reduction in the primary scanning direction in the magnetic duplicator of FIG. 1A and FIG. 1B.

As shown in FIG. 9, the periphery of the recording drum 31 consists of a record portion L ($a_1$-$c_1$ region, for example, 257 mm long) which is used for copy, and a non-record portion M ($c_1$-$a_1$ region, for example, 18 mm long) which is not used for copy. The non-record portion M is necessary for stable running of recording paper. On the other hand, clock pulses more than the number of the bits of the CCD 16 should be applied to the CCD 16 in order to stably take out video informations from the CCD 16. For example, when the number of the bits of the CCD 16 is 2048, the number of the clock pulses is 2078. For that purpose, the number of pulses of the rotary encoder 41 per one revolution is actually 2200.

When A–C (257 mm) of the document of B4-size as shown in FIG. 2 is projected onto the $a_0$-$c_0$ region of the CCD 16 of 2048 bits, the number of the clock pulses of the first channel CH1 per one revolution is 2200 as shown in FIG. 10(c). The number of the clock pulses is larger than the number of the bits of the CCD 16. The video information corresponding to the width (257 mm) of the B4-size document 12 is obtained from 2048 bits of the CCD 16. When the video information is recorded on the $a_1$-$c_1$ region (257 mm) of the recording drum 31 as shown in FIG. 5 and FIG. 9, actual size copy is obtained. The timing of the above described pulses is shown in FIG. 10(a), FIG. 10(b) and FIG. 10(c).

FIG. 10(a) shows the index pulses. One index pulse is generated per one revolution of the recording drum 31. FIG. 10b shows the recording area pulse. During the time when the recording drum 31 is used for copy, the level of the recording area pulse is at "1". This time corresponds to the portion L shown in FIG. 9. During the time when the recording drum 31 is not used for copy, the level of the recording area pulse is at "0". This time corresponds to the portion M shown in FIG. 9.

Next, there will be described method of enlargement in the primary scanning direction according to the above other principle.

Figure 10:
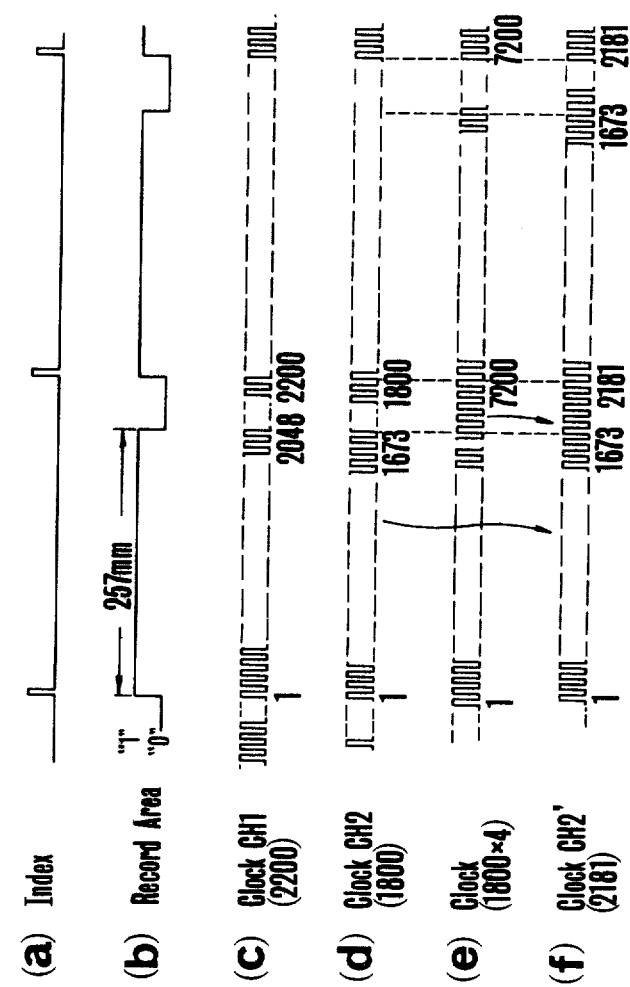
FIG. 10 (a) to (f) are views showing the relationships among index pulse, record area pulse and four kinds of clock pulses for explaining the other principle.

For example, when the width A–B (210 mm) of the A4-size document is projected onto the $a_0$–$b_0$ region of the CCD 16, as shown in FIG. 2, the video information of the width A–B of the document is obtained in 1673 bits. When the CCD 16 is driven by 1800 pulses per one revolution of the recording drum 31, the video information is recorded on the region $a_2$–$b_2$ (257 mm) of the recording drum 31, as shown in FIG 5(f). Referring to FIG. 10, FIG. 10(d) shows 1800 pulses per one revolution of the recording drum 31. 1673 pulses of 1800 pulses correspond to the "1" period of the recording area pulse of FIG. 10(b). Accordingly, the video information of the first bit to 1673rd bit is recorded on the length of 257 mm of the recording drum 31. Thus, the width 210 mm is enlarged to the B4-size width 257 mm. This fact is equal to the principle of FIG. 5.

On the other hand, clock pulses more than the number of the image pickup bits of the CCD should be supplied to the CCD in order to stably operate the latter. For that purpose, clock pulses (FIG. 10(e)) four times as frequent as the clock pulses of FIG. 10(d) are provided. The frequency is $1800\times4=7200$ pulses. When the necessary video information has been obtained in 1673 bits of the CCD 16, the drive clock for the CCD 16 is changed over from the clock of FIG. 10(a) into the other clock of FIG. 10(e) for the "0" period of the recording area pulse of FIG. 10(b). Accordingly, the clock pulses of the number represented by the following equation (1) are supplied to the CCD 16 during one revolution of the recording drum 31:

$$1673+(1800-1673)\times4=2181 \quad (1)$$

The number 2181 is larger than the image pickup bit number 2048 of the CCD 16. Accordingly, the CCD 16 can be stably operated.

The clock CH2 of FIG. 10(d) is used during the "1" period of the recording area pulse shown in FIG. 10(b) so that the image of the document is recorded in enlargement on the recording drum 31. The clock four times as frequent as the clock CH2, as shown in FIG. 10(e), is used during the "0" period of the recording area pulse. As the result, the clock CH2' shown in FIG. 10(f), namely 2181 pulses per one revolution of the recording drum 31, are used. Actually, the clock CH2' is used for driving the CCD 16, instead of the clock CH2 of FIG. 8.

Figure 11:
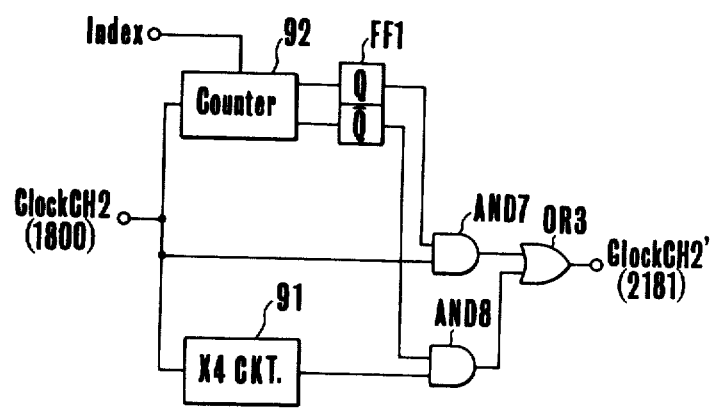
FIG. 11 is a block diagram of a pulse generator for generating the clock pulses shown in FIG. 10.

For example, a pulse generating circuit shown in FIG. 11 is used for producing the clock CH2' of FIG. 10(f) from the clock CH2 of FIG. 10(d).

In the circuit of FIG. 11, the clock CH2 is supplied to a frequency multiplier ($\times 4$) 91. 7200 clock pulses as shown in FIG. 10(e) are produced by the frequency multiplier 91. 1800 clock pulses are supplied to one input terminal of an AND gate $AND_7$. $\overline{Q}$-output of a flip-flop $FF_1$ is supplied to another input terminal of the AND gate $AND_7$. The output of the frequency multiplier 91 is supplied to one input terminal of an AND gate $AND_8$. $\overline{Q}$-output of the flip-flop $FF_1$ is supplied to another input terminal of the AND gate $AND_8$. 1800 clock pulses are further supplied to a counter 92. The counter 92 starts to count the clock pulses in synchronization with the index pulse. When the counter 92 has counted 1673 pulses, it inverts the flip-flop $FF_1$ to put the $\overline{Q}$-output into "1". The Q-output of the flip-flop $FF_1$ is "1" during the time from the first pulse of the clock CH2 to the 1673rd pulse thereof with reference to the index pulse. The clock pulses of the clock CH2 are produced at the output terminal of the AND gate $AND_7$. During that time, the output of the AND gate $AND_8$ is zero. Accordingly, clock pulses of the clock CH2 are obtained from an OR gate $OR_3$.

Then, the $\overline{Q}$-output of the flip-flop $FF_1$ becomes "1" from the 1674th pulse of the clock CH2. Clock pulses four times as frequent as the clock pulses of the clock CH2 are produced at the output terminal of the AND gate $AND_8$. During that time, the output of the AND gate $AND_7$ is zero. Accordingly, the four times clock pulses are obtained from the OR gate $OR_3$. As the result, 2181 pulses as shown by the equation (1) are totally produced between the adjacent index pulses from the circuit of FIG. 11.

It will be understood that the recording area pulse of FIG. 10(b) may be used in the circuit of FIG. 11 instead of the counter 92 and the flip-flop $FF_1$ to effect the above described operation.

Next, there will be described method of reduction in the primary scanning direction according to the other principle shown in FIG. 10.

In this case, there will be used the 2700 clock pulses per one revolution of the recording drum 31 as shown in FIG. 5(g).

When the image of the B4-size (257 mm) document is projected onto the $a_0$–$c_0$ region (2048 bits) of the CCD 16, and the clock CH3 of 2700 pulses per one revolution of the recording drum 31 is used, the corresponding latent image is recorded in reduction to about 210 mm (A4-size) on the $a_3$–$c_3$ ragion of the recording drum 31 as shown in FIG. 5(h). Since the number of the read-out pulses (2700) per one revolution of the recording drum 31 is further larger than the number of the image pickup bits (2048), the CCD 16 stably operates.

Figure 12:
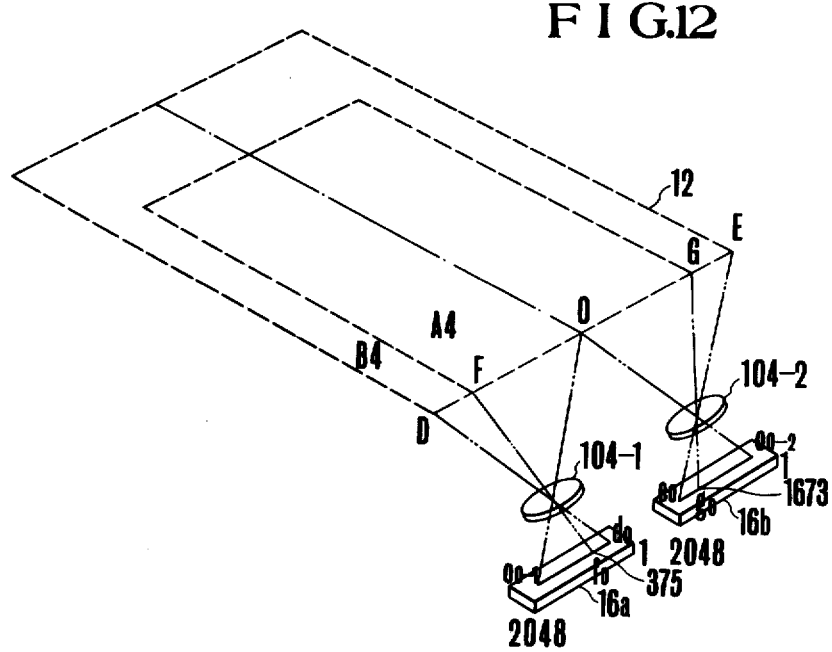
FIG. 12 is a schematic perspective view of an important part of an image pickup part according to one modification of the image pickup part of FIG. 1A and FIG. 2, in which two CCDs as photoelectric converting elements are used.
Figure 13:
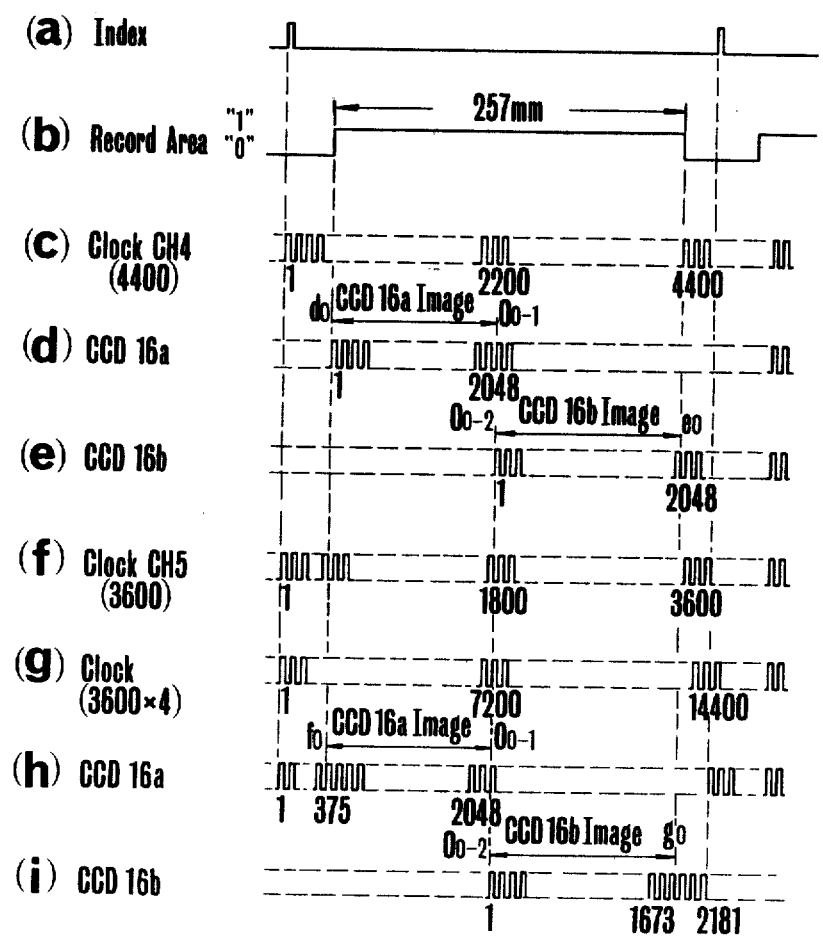
FIG. 13 (a) to (i) are views showing the relationships among index pulse, recording area pulse and clock pulses for the modification of FIG. 12.

Next, there will be described a modification to improve resolution of read-out, with reference to FIG. 12 and FIG. 13. Referring to FIG. 12, two CCDs 16a and 16b are used for reading out one half D–O of the document and another half O–E of the document, respectively. The number of the image pickup bits is $2048\times2$. Accordingly, the number of the image pickup clock pulses is twice as large as that of the image pickup pulses for the one CCD 16, and therefore it is $2200\times2=4400$. The images on the CCDs 16a and 16b can be read out with 4400 clock pulses per one revolution of the recording drum. FIG. 13 shows the timing relationships among different pulses.

In this modification, the image of the document 12 (B4-size) is divided into two. The two are projected onto the CCDs 16a and 16b, respectively. A point D of the document 12 is projected onto a point $d_0$ (the first bit) of the one CCD 16a, while a central point O of the document 12 is projected onto a point $O_{0-1}$ (the 2048th bit) of the one CCD 16a. Intermediate points between the points D and O are projected onto intermediate points (intermediate bits) between the points $d_0$ and $O_{0-1}$. Clock pulses CH4 shown in FIG. 13(c) are used for the CCD 16a. The CCD 16a is so driven that the video signal from the first bit of the CCD 16a is recorded on the start of the record area of the recording drum 31 as shown in FIG. 13(d).

Similarly, the other half O-E of the document 12 is projected onto a region $O_{0-2}$-$e_0$ of the other CCD 16b. A point O of the document 12 is projected onto the first bit of the CCD 16b. A point E of the document 12 is projected onto the 2048th bit of the CCD 16b. The CCD 16b is so driven that video signals are read out from the CCD 16b in the timing shown in FIG. 13(e). The first bit corresponds to the center of the record area of the recording drum 31. The 2048th bit corresponds to the end of the record area of the recording drum 31. Thus, the document is copied in actual size.

Next, there will be described enlargement operation (A4-size→B4-size).

$1800 \times 2 = 3600$ pulses per one revolution of the recording drum 31 are used for the enlargement operation. The document 12 is put onto the center of the surface of the document support in the manner shown in FIG. 12. One half of the document 12 is projected onto the one CCD 16a, while another half of the document 12 is projected onto the other CCD 16b. In other words, an F-O region of the A4-size document 12 is projected onto an $F_0$-$O_{0-1}$ region of the CCD 16a. The position $f_0$ corresponds to the 375th bit of the CCD 16a, since the A4-size corresponds to the 1673 bits, and 2048 minus 1673 is equal to 375. The image of the F-O region of the A4-size document 12 is projected onto the region between the 375th bit and the 2048th bit of the CCD 16a.

Similarly, the other half O-G of the A4-size document 12 is projected onto an $O_{0-2}$-$g_0$ region of the CCD 16b which corresponds to the region between the first bit and the 1673rd bit.

The timing relationship between clock pulses for the CCDs 16a and 16b is shown in FIG. 13(h) and (i). The CCDs 16a and 16b are so driven that the video-signals from them are recorded on the record area of the recording drum 31. In the manner shown in FIG. 10(f), a $d_0$-$f_0$ region of the CCD 16a and $g_0$-$e_0$ region of the CCD 16b which correspond to the non-record area of the recording drum 31 are driven with the more frequent clock (four times). As shown in FIG. 13(h) and (i), the CCD 16a is driven from the first bit to the 374th bit with the more frequent clock ($3600 \times 4$), and it is driven from the 374th bit to the 2048th bit with the normal clock (3600). The other CCD 16b is driven from the first bit to the 1673rd bit with the normal clock (3600), and it is driven from the 1674th bit to the terminal bit with the more frequent clock. Since pulses more than 2100 per half revolution of the recording drum 31 are applied to the CCDs 16a and 16b, they can stably operate. The exposure times are the same for the CCDs 16a and 16b. Further, the exposure time for the enlargement operation is nearly equal to that for the actual size copy operation. Accordingly, the outputs of the CCDs 16, 16a and 16b are maintained constant. A control circuit for the above described operation may be nearly equal to that of FIG. 11.

Similarly in reduction operation, $2700 \times 2 = 5400$ pulses per one revolution of the recording drum 31 are used for the CCDs 16a and 16b. When the document is put onto the center of the document support, the control of the CCDs 16a and 16b can be facilitated as the enlargement operation.

Although there have been described the typical enlargement ratio and reduction ratio, it will be understood that arbitrary enlargement ratio and reduction ratio are possible on the basis of the principle of this invention.

Further, it will be understood that different copy magnifications can be selected in the primary scanning direction and the secondary scanning direction, and that different copy magnifications (enlargement ratios and reduction ratios) can be selected for a desired copy edition of one document.

While the preferred embodiment has been described, variations thereto will occur to those skilled in the art within the scope of the present inventive concepts which are delineated by the following claims.

What is claimed is:

1. A copy magnification change apparatus in a magnetic copying machine in which light from a document is converted into an electrical video signal by photoelectric converting means, said video signal being supplied to a magnetic head, which is moved along the axial direction of a magnetic recording drum to form a magnetic latent image on said magnetic recording drum, said copy magnification change apparatus comprising:
   (a) a first clock pulse generating means for generating in accordance with the rotation of said magnetic recording drum, an index pulse representing one revolution of said magnetic recording drum, a first train of clock pulses for an actual size copy operation, each representing a position of the periphery of said magnetic recording drum during one revolution of said magnetic recording drum, and a second train of clock pulses each representing a position of the periphery of said magnetic recording drum during one revolution of said recording drum, the pulse interval of said second train of clock pulses being longer than that of said first train of clock pulses, and a third train of clock pulses each representing a position of the periphery of said magnetic recording drum during one revolution of said recording drum, the pulse interval of said third train of clock pulses being shorter than that of said first train of clock pulses;
   (b) said photoelectric converting means being coupled to one of said first, second and third trains of clock pulses to read out said electrical video signal;
   (c) a second clock pulse generating means for generating, on the basis of said index pulse, a fourth train of clock pulses having a pulse number for actual size copy operating to control a movement length of said magnetic head, a fifth train of clock pulses whose pulse number is larger than that of said fourth train of clock pulses, a sixth train of clock pulses whose pulse number is smaller than that of said fourth train of clock pulses;
   (d) a drive source for moving said magnetic head along the axial direction of said magnetic recording drum for every one line read-out of said photoelectric converting means and for controlling the movement length of said magnetic head on the basis of pulse number;
   (e) a selecting means for selectively outputting said first train of clock pulses from said first clock pulse generating means and said fourth train of clock pulses from said second clock pulse generating means in actual-size copy operation, said second train of clock pulses from said first clock pulse generating means and said fifth train of clock pulses from said second clock pulse generating means in enlargement copy operations and said third train of clock pulses from said first clock pulse generating means and said sixth train of clock pulses from said second clock pulse generating means in reduction copy operation.

2. A copy magnification change apparatus in a magnetic copying machine in which light from a document is converted into an electrical video signal by photoelectric converting means, said video signal being supplied to a magnetic head, which is moved along the axial direction of a magnetic recording drum to form a magnetic latent image on said magnetic recording drum, said copy magnification change apparatus comprising:

(a) a first clock pulse generating means for generating, in accordance with the rotation of said magnetic recording drum, an index pulse representing one revolution of said magnetic recording drum, and reference clock pulses each representing a position of the periphery of said magnetic recording drum during one revolution of said magnetic recording drum;

(b) a second clock pulse generating means for generating, on the basis of said reference clock pulses, a first train of clock pulses for actual size copy operation to be supplied into said photoelectrical converting means so as to read out said electrical video signal, and a second train of clock pulses whose pulse interval is longer than that of said first train of clock pulses, and a third train of clock pulses whose pulse interval is shorter than that of said first train of clock pulses;

(c) a drive source for moving said magnetic head along the axial direction of said magnetic recording drum to every one line read-out of said photoelectric converting means and for controlling the movement length of said magnetic head on the basis of pulse number;

(d) a third clock pulse generating means for generating, on the basis of said index pulse, a fourth train of clock pulses having a pulse number for actual-size copy operation to control said movement length of said magnetic head, and a fifth train of clock pulses whose pulse number is larger than that of said fourth train of clock pulses and a sixth train of clock pulses whose pulse number is smaller than that of said fourth train of clock pulses;

(e) a selecting means for selectively outputting said first train of clock pulses from said second clock pulse generating means and said fourth train of clock pulses from said third clock pulse generating means in actual size copy operation, and said second train of clock pulses from said second clock pulse generating means and said fifth train of clock pulses from said third clock pulse generating means in enlargement copy operation, and said third train of clock pulses from said second clock pulse generating means and said sixth train of clock pulses from said third clock pulse generating means in reduction copy operation.

3. A copy magnification change apparatus in a magnetic copying machine according to claim 2, in which said first train of clock pulses is equal to said reference clock pulses.

4. A copy magnification change apparatus in a magnetic copying machine according to claim 1 or 2, in which said drive source comprises a pulse motor.

5. A copy magnification change apparatus in a magnetic copying machine according to claim 1 or 2, in which said drive source comprises a servo motor.

6. A copy magnification change apparatus in a magnetic copying machine according to claim 1 or 2, in which said apparatus includes a manually operable switch for actual size copy, at least one manually operable enlargement copy switch and at least one manually operable reduction copy switch.

* * * * *